United States Patent
Vanderhye et al.

(10) Patent No.: US 7,766,600 B1
(45) Date of Patent: Aug. 3, 2010

(54) SAVONIUS ROTOR WITH SPILLOVER

(75) Inventors: Robert A. Vanderhye, 801 Ridge Dr., McLean, VA (US) 22101; Mike Augello, Troy, NY (US); Terrance Nicol, Troy, NY (US); Chris Rees, Troy, NY (US); James Shedd, Intervale, NH (US); William Zbytniewski, Troy, NY (US)

(73) Assignee: Robert A. Vanderhye, McLean, VA (US)

( * ) Notice: Subject to any disclaimer, the term of this patent is extended or adjusted under 35 U.S.C. 154(b) by 1230 days.

(21) Appl. No.: 10/854,280

(22) Filed: May 27, 2004

Related U.S. Application Data

(63) Continuation-in-part of application No. 10/443,954, filed on May 23, 2003.

(60) Provisional application No. 60/386,569, filed on Jun. 7, 2002.

(51) Int. Cl.
*F03D 3/00* (2006.01)

(52) U.S. Cl. .................... 415/4.2; 415/4.4; 415/907; 416/243; 416/DIG. 9

(58) Field of Classification Search ............ 416/132 A, 416/132 B, 142, 194, 195, 196 A, 197 A, 416/93 R, 198 R, 198 A, 200 R, 200 A, 210 R, 416/210 A, 211, 240, DIG. 6; 415/4.2, 4.4, 415/907
See application file for complete search history.

(56) References Cited

U.S. PATENT DOCUMENTS

| | | | | |
|---|---|---|---|---|
| 683,935 | A | * 10/1901 | Hensel | ......................... 415/4.4 |
| 1,602,853 | A | * 10/1926 | Maher | .................... 416/197 A |
| 1,697,574 | A | 1/1929 | Savonius | |
| 1,766,765 | A | 6/1930 | Savonius | |
| 2,677,344 | A | 5/1954 | Annis | |

(Continued)

FOREIGN PATENT DOCUMENTS

CH 147730 A * 9/1931 ............. 416/197 A (Continued)

OTHER PUBLICATIONS

Khan, "Model and Prototype Performance Characteristics of Savonius Rotor Windmill"; Wind Engineering, vol. 2, No. 2, 1978, pp. 75-85.

(Continued)

*Primary Examiner*—Ninh H Nguyen

(57) ABSTRACT

A Savonius vertical axis wind turbine rotor has first and second curved vanes having remote substantially vertical edges widely spaced form each other, and proximate substantially vertical edges more closely horizontally spaced from each other and horizontally overlapping are associated with a substantially vertical central shaft construction. The shaft construction is operatively connected to the vanes and mounts the vanes and adjacent the proximate edges. The central shaft construction may comprise a perforated shaft (e.g. a single perforated shaft), or multiple shafts. In any event, the shaft construction, and mounting of the rotor vanes, allow, during use, spillover of wind from the proximate edge of one vane to another vane during powered rotation of the vanes in response to wind. The rotor is preferably omni-directional. The rotor may have a third set of vanes, and different vertically spaced sets of vanes circumferentially offset with respect to each other. The rotor may be in combination with a mount to provide a wind turbine, and may be in combination with a driven device such as a generator, propeller, or pump.

19 Claims, 4 Drawing Sheets

U.S. PATENT DOCUMENTS

| | | | | |
|---|---|---|---|---|
| 4,086,023 | A * | 4/1978 | Morgan | 416/132 B |
| 4,156,580 | A | 5/1979 | Pohl | |
| 4,359,311 | A * | 11/1982 | Benesh | 416/197 A |
| 4,650,403 | A * | 3/1987 | Takacs | 416/197 A |
| 4,830,570 | A | 5/1989 | Benesh | |
| 4,979,871 | A | 12/1990 | Reiner | |
| 5,494,407 | A * | 2/1996 | Benesh | 416/197 A |
| 6,345,957 | B1 * | 2/2002 | Szpur | 416/197 A |

FOREIGN PATENT DOCUMENTS

| | | | | |
|---|---|---|---|---|
| DE | 821930 | A * | 11/1951 | 416/197 A |
| DE | 2225988 | A * | 12/1973 | 416/197 A |
| FR | 1021619 | A * | 2/1953 | 416/197 A |
| SE | 65940 | A * | 12/1924 | 416/197 A |
| SE | 111334 | A * | 1/1945 | 416/197 A |

OTHER PUBLICATIONS www.enseeiht.fr/hmf/travaus; Etude Numerique Voilure Amelioree; 2003.

Turner, "Making a simple Savonius wind turbine"; www.ata.org.au; admitted prior art, pp. 1-5.

www.denkins.net/dustin/windturbine.htm; "Savonius Wind Turbine"; admitted prior art, pp. 1-2.

Kozlowski; "Savonius Rotor Construction . . . "; Sep. 1977; VITA, Inc., pp. 1-5, 7-8, 16, 18, 40, 44, 46-47, 49-53.

Boll; "More on The Savonius Super Rotor!"; Mother Earth News, Issue No. 28—Jul./Aug. 1974, pp. 1-3.

* cited by examiner

SAVONIUS ROTOR WITH SPILLOVER

CROSS REFERENCE TO RELATED APPLICATIONS

This application is a continuation in part of application Ser. No. 10/443,954 filed May 23, 2003, which in turn is based upon provisional application Ser. No. 60/386,569 filed Jun. 7, 2002, the disclosure of which is incorporated by reference herein.

BACKGROUND AND SUMMARY OF THE INVENTION

The Savonius vertical axis wind turbine is the definitive drag type vertical axis wind turbine. It uses a plurality of curved vanes which are mounted for rotation about a substantially vertical axis. In most conventional Savonius rotors, only two vanes are provided, and the vanes have generally an S-shape when viewed from above or below. Although invented in the 1920s (see U.S. Pat. Nos. 1,697,574 and 1,766,765, for example), and despite its numerous advantages (including high torque, simplicity of construction, no need for speed limiting, not significantly affected by turbulence, the ability to self-start at very low wind speed, and no need to orient it into the wind—that is it is "omni-directional"), the Savonius wind turbine has never been marketed on a significant commercial scale. Most are home made (see *Making a simple Savonius wind turbine* by Lance Turner, at web site ata.org.au: *Savonius Rotor Construction: Vertical Axis Wind Machines From Oil Drums* by Jozef Kozlowski Vita Publications, 1977; and *Savonius Wind Turbine by Denkins*, at web site denkins.net/dustin/windturbine.htm) with rigid supports on the top and bottom of each set of vanes. However, there are three common conventional types (as described in the Turner article).

The first common conventional type uses a central shaft to provide the majority of the support for the vanes. This design has the advantage of allowing the rotor to be supported only from the bottom, and can minimize weight. However, it does not have optimum efficiency.

The second and third common conventional types (differing from each other only in the particular curvatures of the vanes) allow spillover of the wind from one vane to another by horizontally spacing the proximate ends of the vanes. However, this conventionally requires utilizing disc shaped solid supports above and below the vanes, and mounting structures both above and below the unit. This increases cost and limits the versatility of the units. Another type of vertical axis wind turbine, which has individual Savonius rotors but mounted so that it has only some features in common with a conventional Savonius, is disclosed in U.S. Pat. No. 4,830,570. This patent shows a rotor having bearings connected to support arms at both the top and bottom of the curved blades (vanes) and a solid exterior single central shaft remote from (not adjacent) the interior blade vertical edges (proximate edges) of both blades. In this construction the central shaft can actually interfere with the spillover of wind from one blade to the other, and likely will unless the blades are horizontally spaced from each other a distance that may not be optimum for efficiency. Also, in this patent the Savonius wind turbine desirable feature of omni-directionality is eliminated by mounting two rotors on horizontally spaced vertical axes with a deflector plate between them, and a partition plate with tail extending perpendicular to the deflector plate to orient the assembly into the wind.

According to the present invention, a full-advantage (including omni-directionality) Savonius vertical axis wind turbine and rotor therefor (that is one having a plurality of curved vanes, typically two or three, with proximate substantially vertical edges horizontally spaced from and overlapping each other) is provided which has the strength, versatility, and simplicity advantages of the first conventional type described above, yet has approximately the efficiency of the second and third conventional types (depending upon vane construction). This is accomplished by providing a substantially vertical central shaft construction positioned adjacent the proximate edges of the vanes and operatively connected to the vanes and mounting the vanes, during use, so that there is spillover of wind from the proximate edge of one vane to the other vane during powered rotation thereof in response to wind. (The term "operatively connected", and modifications thereof, as used herein means what it normally does any suitable connection that allows the components to function properly.) While any central shaft construction that achieves these results may be provided, two suitable alternatives are a single substantially vertical perforated shaft connected to both vanes (including, perhaps, along the proximate edges thereof), or first and second horizontally spaced substantially vertical shafts one adjacent each of the proximate edges of the vanes. From tests constructed of a model of the Savonius rotor according to the invention—compared to one with a single central shaft and/or heavy upper and lower plate constructions—one can expect both increased torque and increased rpm at both low (e.g. about 7 mph) and moderate (e.g. about 17 mph) wind speeds. In one test the maximum rpm was almost 50% greater, and the maximum torque increased more than 50%.

While typically the vanes of the rotor according to the invention have a simple curvature (that is are curved only about a substantially vertical axis), they may have complex curvatures (that is curved about multiple axes, such as defining a generally helical surface). The vanes may also be tapered vertically, for example having a larger horizontal dimension at the bottom, or alternatively at the top, and may be provided in sets stacked one above the other with the vanes of the stacked sets either aligned, or preferably angularly offset from each other (e.g. about 15-90 degrees, preferably about 30-60 degrees). While the Savonius rotors according to the invention have the advantage of not necessarily requiring a support at the top of the central shaft construction, such a top support may be provided where desired and cost-effective. The rotors can be connected up to almost any type of driven device including (without limitation) a water propeller, a pump movable element, an electrical generator, or a fan blade.

According to one aspect of the present there is provided an omni-directional Savonius vertical axis wind turbine rotor comprising: First and second curved vanes having remote substantially vertical edges widely spaced from each other, and proximate substantially vertical edges more closely horizontally spaced from each other and horizontally overlapping. And, a substantially vertical central shaft construction operatively connected to the vanes and mounting the vanes and adjacent the proximate edges so that, during use, there is spillover of wind from the proximate edge of one vane to another vane during powered rotation of the vanes in response to wind.

In one variant, the shaft construction comprises a single substantially vertical perforated shaft connected to both vanes.

In another variant, the shaft construction comprises first and second (or more) horizontally spaced substantially vertical shafts adjacent the proximate edges of the first and second vanes, respectively. This variant may further comprise vertically spaced first and second substantially horizontally extending connecting elements which connect the first and second (or more) shafts together without significantly interfering with spillover of wind from one vane to the other.

The wind turbine rotors as recited above may be in combination with a mount which mounts the shaft construction and vanes for rotation about a substantially vertical axis, and for operative connection of the shaft construction to a powered element, to provide a wind turbine. In the multiple-shaft embodiment, the mount may comprise a single shaft element adjacent bottom portions of the shafts and operatively attached to the shafts so that the turbine is substantially devoid of a top mount for the rotor; and the single shaft element may be connected to the first and second shafts by attachment to the first connecting element. The turbine may be in combination with a powered element comprising an electrical generator, a water pump movable element, a fan blade, or a water propeller, operatively connected to the mount; and the vanes may have a complex curvature.

In either variant of the Savonius vertical axis wind turbine rotor a third (or more, although more than three is usually less desirable than two or three) vane may be provided. For example, the multi-shaft variant may further comprise a third curved vane having remote and proximate substantially vertical edges, and the shaft construction may comprise a third substantially vertical shaft operatively connected to the third vane so that the proximate ends of the first, second, and third vanes are spaced from each other and, during use, there is spillover of wind from each vane to another during rotation of the shafts.

The Savonius vertical axis wind turbine rotor may further comprise substantially rigid spokes operatively connected to top and/or bottom portions of the vanes and extending substantially radially outwardly from the central shaft construction. Also, the vanes may be made of flexible, collapsible, material, and may include removable battens, and the spokes may move along the shaft construction. Further, there may be provided remote support elements for supporting the remote substantially vertical edges of the vanes, and connected to the spokes. As another alternative, the vanes may be of relatively rigid, substantially non-collapsible, material, with the vanes operatively connected to the central shaft construction adjacent the proximate ends thereof.

The first and second vanes may comprise a first set, and the rotor may further comprise a second set of vanes associated with the central shaft construction and mounted vertically above the first set and offset with respect to the first set so as to enhance smooth rotation of the shaft construction and vanes about a substantially vertical axis. Third (or more) such sets may also be provided.

According to another embodiment of the invention, a Savonius vertical axis wind rotor is provided (that is preferably, although not necessarily, omni-directional) comprising: First and second curved vanes having remote substantially vertical edges widely spaced from each other, and proximate substantially vertical edges more closely horizontally spaced from each other and horizontally overlapping. And, a single substantially vertical central perforated shaft operatively connected to the vanes and adjacent the proximate edges thereof, and mounting the vanes so that, during use, there is spillover of wind from one vane proximate edge to another vane during powered rotation of the vanes in response to wind.

The rotor may be in combination with a mount which mounts the shaft construction and vanes for rotation about a substantially vertical axis, and for operative connection of the shaft construction to a powered element, to provide a wind turbine; and the mount may be adjacent a bottom portion of the shaft construction so that the wind turbine is substantially devoid of a top mount for the rotor. In one embodiment the mount comprises a solid wall continuation of the perforated shaft.

According to yet another embodiment of the invention there is provided a Savonius vertical axis wind turbine rotor comprising: First and second at least partially curved vanes having remote edges widely spaced from each other, and proximate edges closely spaced from each other, the vanes of flexible, collapsible, material. First and second sets of a plurality of substantially rigid substantially radially extending at least partially curved spokes operatively connected to the first and second vanes, respectively, at least one spoke of each set having a collar adjacent the proximate edge of the vane with which it is associated. First and second horizontally spaced substantially vertical rotatable central shafts operatively connected to the first and second sets of spokes, respectively, the collars substantially surrounding the shafts so that the spokes are movable along the shafts from a position in which the vanes are operative to a position in which the vanes are collapsed. And, the shafts mounting the vane proximate edges so that they are overlapped and so that there is spillover from one vane proximate edge to another vane during rotation of the vanes.

According to yet another embodiment there is provided an omni-directional Savonius vertical axis wind turbine rotor comprising: First, second, and third curved vanes each having remote substantially vertical edges widely spaced from each other, and proximate substantially vertical edges more closely horizontally spaced from each other and horizontally overlapping. And a substantially vertical central shaft construction operatively connected to the vanes and mounting the vanes adjacent the proximate edges so that, during use, there is spillover of wind from the proximate edge of each vane to another vane during powered rotation of the vanes in response to wind.

Details of this embodiment, or combinations with this embodiment, may be as described above with respect to the first mentioned embodiment, such as the provision of three substantially vertical shafts.

It is the primary object of the present invention to provide a highly efficient Savonius vertical axis rotor, and wind turbine constructed using the rotor, that has enhanced features while retaining all, or substantially all, of the advantages of a conventional Savonius. This and other objects of the invention will become clear from a detailed inspection of the application and the appended claims.

DETAILED DESCRIPTION OF THE DRAWINGS

Figure 1:
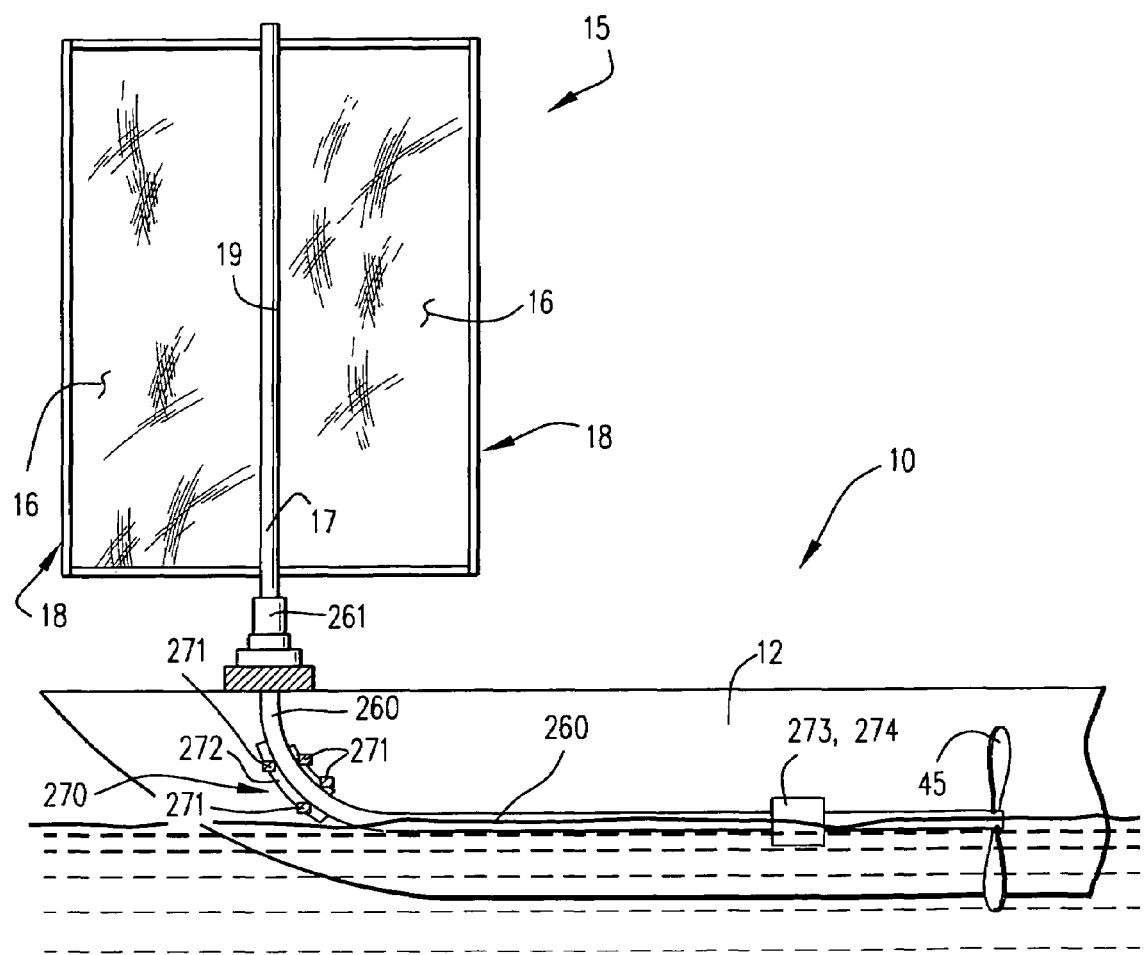
FIG. 1 is partial side view of a wind powered water craft using a wind turbine rotor according to the present invention.

FIG. 1 schematically illustrates a generic novel Savonius vertical axis wind turbine rotor according to the invention mounted on a water craft for powering the craft, such as described generally in co-pending U.S. application Ser. No. 10/443,954 filed May 23, 2003. The rotor 15 has first and second curved vanes 16. The vanes 16 are shown only schematically in FIG. 1, but have remote substantially vertical edges 18 widely spaced from each other, and proximate substantially vertical edges 19 (only one shown in FIG. 1) more closely horizontally spaced from each other and horizontally overlapping (not visible in FIG. 1). The rotor 15 also includes a substantially vertical central shaft construction, shown only schematically at 17, operatively connected to (that is associated with in any manner that is operative/functional) the vanes 16 and mounting the vanes 16 and adjacent the proximate edges 19 so that, during use, there is spillover of wind from the proximate edge 19 of one vane to the other during powered rotation thereof in response to wind. The rotor 15 has the advantages of the conventional central shaft types of Savonius wind rotors, but also the enhanced operation resulting from spillover of the conventional disc shaped solid support-type Savonius wind rotors.

FIG. 1 shows the rotor 15 mounted by a lower bearing 261 on a water craft 10, with a flexible shaft 260 connecting the shaft construction 17 to a propeller for driving the craft 10. Thus the rotor 15 becomes part of a wind turbine for powering the craft 10, with the only mount at the base of the shaft construction 17, that is no upper mount.

FIGS. 2-5 show details of a first embodiment of the shaft construction 17 of FIG. 1, which allows spillover from one vane to the next.

Figure 2:
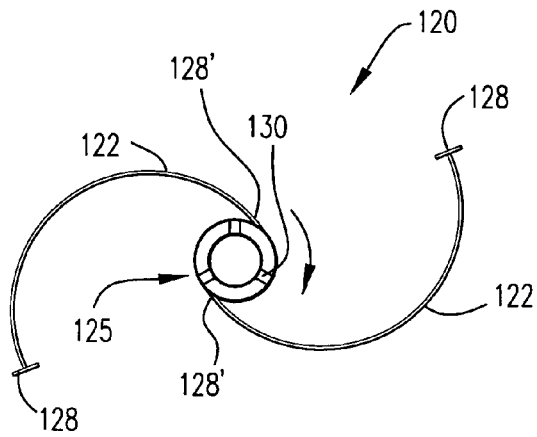
FIGS. 2 and 3 are top and partial side views, respectively, of a first exemplary perforated central shaft Savonius wind turbine rotor according to the present invention.
Figure 3:
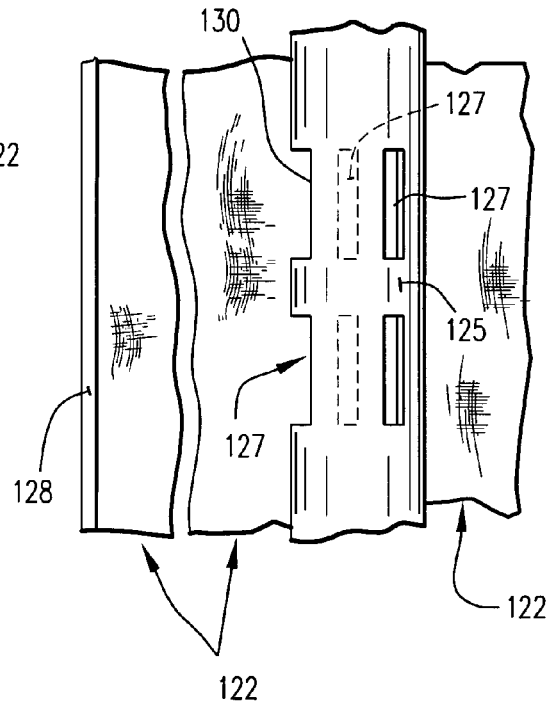

The omni-directional Savonius rotor 120 of FIGS. 2 and 3 has vanes 122 with remote edges/end terminations 128 and proximate edges/end terminations 128' horizontally overlapping each other, as clear in FIG. 2. The shaft construction comprises a single perforated central shaft 125, the perforations 127 in the shaft 125 allowing spillover of wind from one vane 122 to the other as the shaft 125 mounts the vanes 122, and adjacent the proximate edges 128' thereof. In the embodiment actually illustrated, the edges 128' are actually affixed to the shaft 125 by either permanent or releasable conventional mechanisms, such as adhesive, snaps, rivets, hook and loop fasteners, or the like.

The vanes 122 may be of any suitable relatively rigid (such as aluminum or other sheet metal/material, or corrugated plastic such as fiber-reinforced plastic) or collapsible (such as conventional high quality sail or kite "cloth", like PEN-TEX™) material, and if of collapsible material may include conventional removable battens (not shown). Substantially radial vane supports/spokes may be provided wherever desired, such as at the top and bottom of each vane 122. The spokes may be integral with, or permanently or removably connected to the shaft 125. The vanes may have any curvature that is optimum or desirable for a particular use.

The perforations 127 in the shaft 125 may be of any suitable construction, formed in any suitable manner. For example, the shaft 125 may be cast with the perforations 127 provided for in the mold, or the perforations 127 may be formed by any conventional method after the shaft 125 is initially constructed. The perforations 127 may be substantially vertically elongated slots as seen in FIG. 3, or have a spiral or curvilinear configuration, or be in the form of round or polygonal holes. The shaft 125 may be of fiber-reinforced plastic pipe, aluminum pipe, or other types of tubes, with passage-defining hollow elements 130 extending between cooperating perforations 127 on opposite sides of the shaft 125. Alternatively, the shaft 125 may be solid with the perforations 127 through-extending bores (e.g. formed by drilling, burning, or machining) therein.

Figure 4:
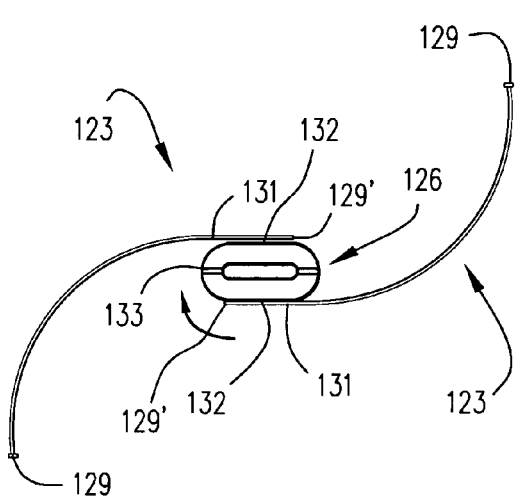
FIGS. 4 and 5 are views like those of FIGS. 2 and 3 of a second exemplary perforated central shaft Savonius wind turbine rotor according to the present invention.
Figure 5:
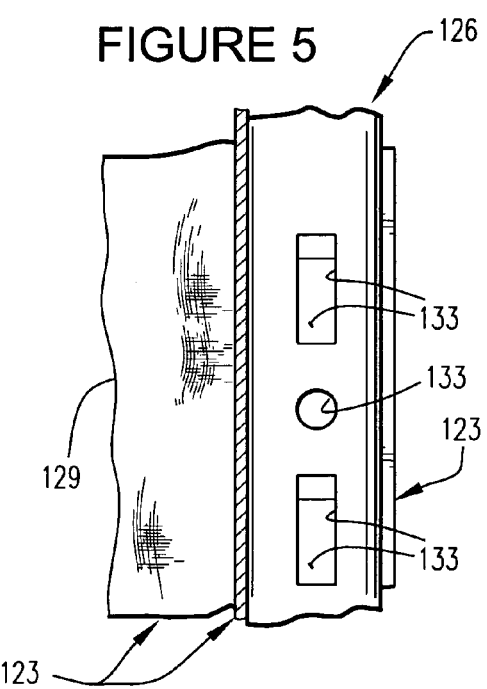

In the FIGS. 4 and 5 construction, the rotor 121 has vanes 123 with substantially planar end portions 131 adjacent the overlapping proximate end terminations/edges 129' thereof, spaced from the remote edges 129. The end portions 131 may be securely affixed to the perforated central shaft 126 by providing cooperating flat sides 132 for the shaft 126. For example, the entire shaft 126 where connected (either permanently or releasably, as described above) to the vanes 123 may have a polygonal (preferably substantially square) cross-section with perforations 133 extending substantially parallel to the surface 132. Alternatively the shaft 126 may be substantially circular in cross-section, and the portions thereof to be affixed to the end portions 131 flattened. Attachment of the portions 131 to the shaft 126 surfaces 132 may be by welding, mechanical fasteners, adhesive, or other conventional mechanisms.

The perforations 133 may have a wide variety of shapes such as those shown in FIG. 5, or many others. The perforations 133 on opposite sides of the shaft 126 may be aligned (e.g. the round holes in FIG. 5) or offset (the slots 133 in FIG. 5).

Figure 6:
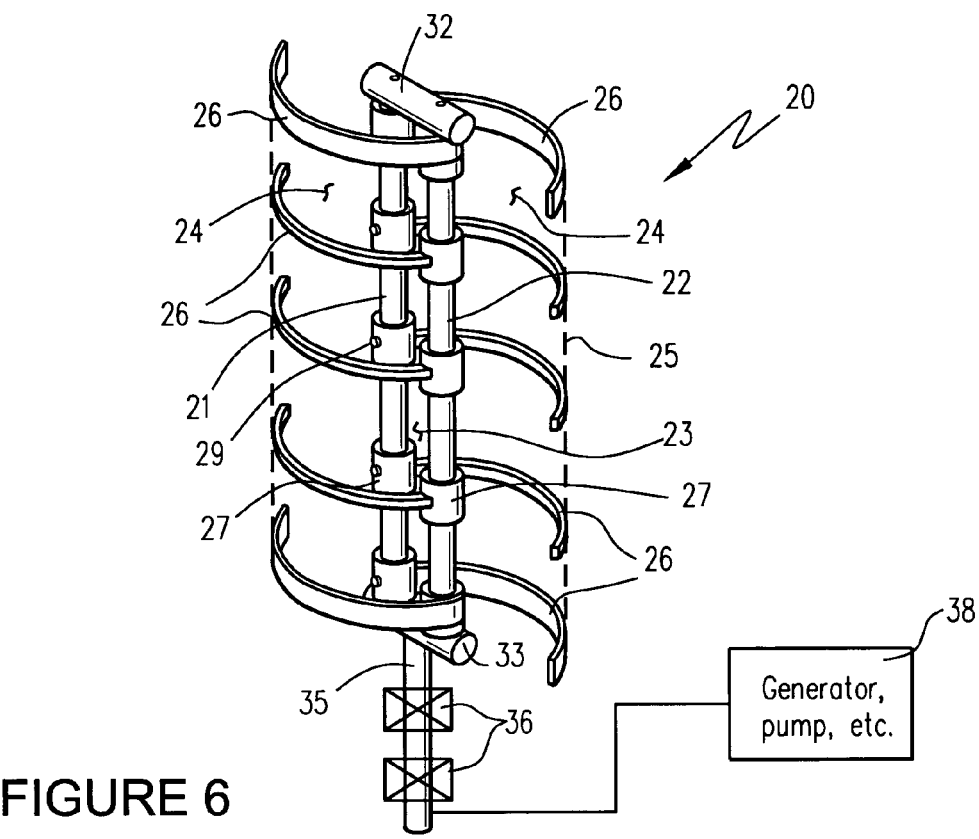
FIG. 6 is a top perspective view of one form of a multi-shaft Savonius wind turbine rotor according to the present invention, in deployed position, but with the collapsible material vanes shown in dotted line for clarity of illustration, and shown schematically in combination with an exemplary mount and an exemplary driven device.
Figure 7:
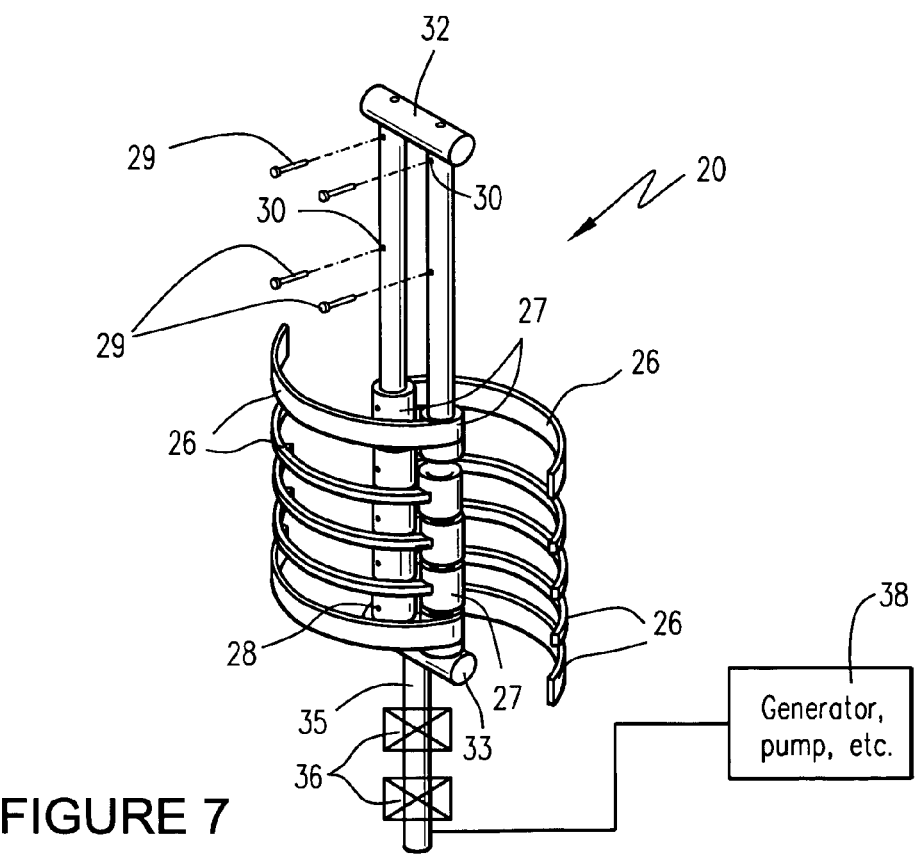
FIG. 7 is a view of the embodiment of FIG. 6 with the spokes in collapsed position, and with the collapsible material vanes removed for clarity of illustration.

In the Savonius rotor 20 of the FIGS. 6 & 7 embodiment, the shaft construction 17 comprises first 21 and second 22 horizontally spaced substantially vertical shafts adjacent proximate, overlapping, substantially vertical edges 23 of the vanes 24, widely spaced from the remote edges 25 of the vanes 24. The shafts 21, 22 may be made of any suitable material (e.g. aluminum or fiber-reinforced plastic).

In the FIGS. 6 & 7 embodiment, the vanes 24 are of collapsible material (such as tightly woven or non-woven sail cloth), and preferably a plurality of substantially radially extending (but curved to define a curvature in the vanes 24) spokes 26 are provided associated with each shaft 21, 22. The vanes 24 may be attached to/associated with the spokes 26 in any conventional manner, or in any manner shown in parent application Ser. No. 10/443,954. With the exception of the bottom (or perhaps others) of the spokes 26, they are preferably slidable along the shafts 21, 22, having collars 27 that encircle the shafts 21, 22. The collars 27 each preferably have one or more openings 28 therein which receive removable mechanical fasteners 29 (of any type as described in the parent application Ser. No. 10/443,954). The fasteners 29 hold the collars 27 in the positions illustrated in FIG. 6 when the vanes 24 are deployed and functional. For example, the fasteners may penetrate the openings 30 in the shafts 21, 22. However, when the fasteners 29 are removed they allow the collars 27 to fall under the force of gravity to the collapsed/non-functional position of FIG. 7. The vanes, 24 collapse in the FIG. 7 position, too, but are not shown in FIG. 7 for clarity of illustration.

While a wide variety of other constructions may be provided, in the embodiment illustrated in FIGS. 6 & 7 the rotor 20 includes first (e.g. top) and second (e.g. bottom) vertically spaced substantially horizontally extending connecting elements 32, 33, respectively. The elements 32, 33 connect the shafts 21, 22 together without significantly interfering with spillover of wind from one vane 24 to the other. More or less connecting elements 32, 33, and of different shapes, texture, wind profile (e.g. perforated, slanted, aerodynamic, wing-shaped, etc.), or location, other than illustrated, may be provided.

FIGS. 6 & 7 also show the rotor 20 as part of a wind turbine, that is provided with a mount which mounts the shafts 21, 22 for rotation about a substantially vertical axis. In the embodiment illustrated, the mount comprises a single shaft element 35 adjacent bottom portions of the shafts 21, 22 (e.g. welded or otherwise attached to the connecting element 33), which is received by one or more conventional bearings 36. In this way the rotor 20 can be mounted from the bottom only—that is, the turbine is devoid of a top mount for the rotor 20. Also, the wind turbine may include the rotor 20 and mount 35/36 operatively connected (in any conventional manner) to a powered element 38. The element 38 may be any conventional element that can be driven by a Savonius rotor 20, such as an electrical generator (dc or ac, with or without gearing), a pump movable element, a fan blade, a boat propeller, etc.

Figure 8:
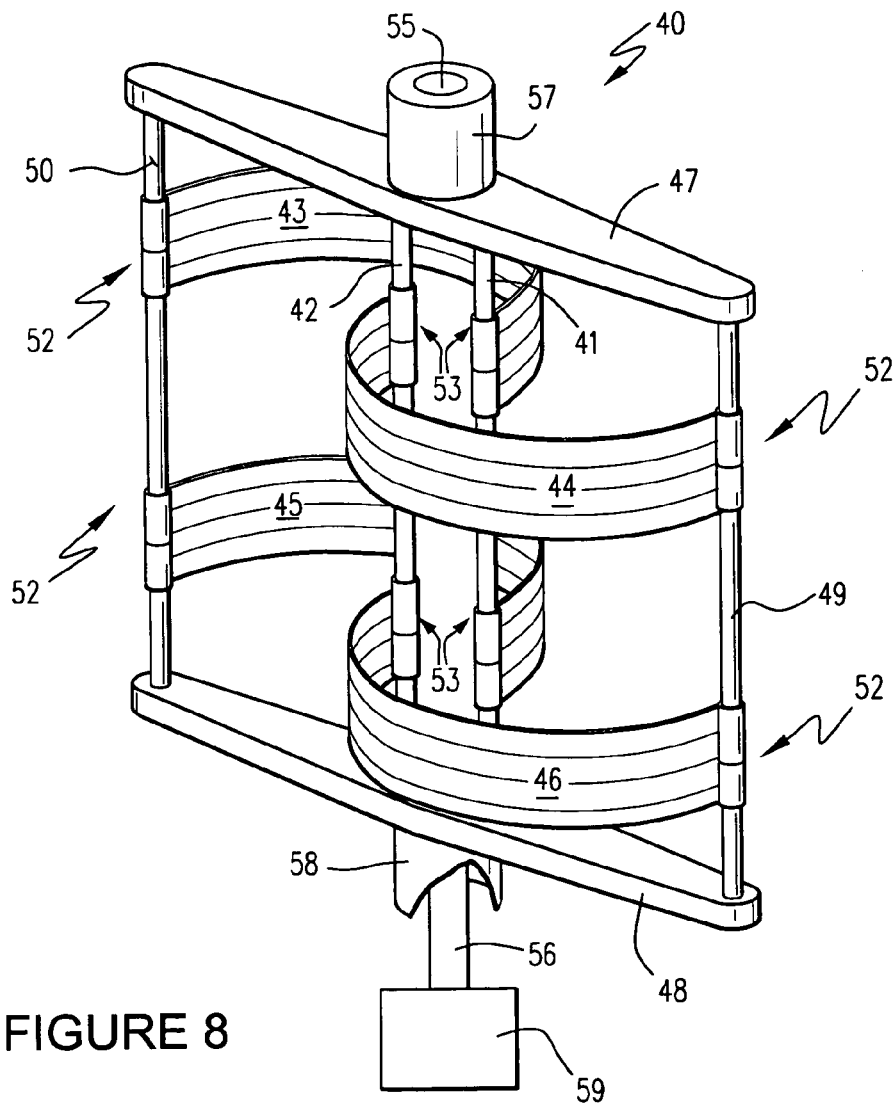
FIG. 8 is a top perspective view, like that of FIG. 6, of another form of multi-shaft Savonius wind turbine rotor according to the invention, with the vanes illustrated in solid line, and shown schematically in combination with an exemplary mount and an exemplary driven device.

FIG. 8 shows an embodiment of a Savonius rotor 40 having first and second central shafts 41, 42 like the FIG. 6 embodiment, but showing different connections of the vanes 43, 44, 45, 46 to the other elements of the rotor 40. This embodiment includes upper 47 and lower 48 radial arms extending outwardly from both shafts 41, 42 and supporting vertical posts 49, 50 at or adjacent remote ends thereof. The shafts 41, 42 may be rigidly connected to the arms 47, 48, by any suitable conventional mechanism. As one example, the shafts 41, 42 may be received by openings (not shown) in the arms 47, 48 and welded or adhesively affixed in place.

In the FIG. 8 embodiment, the vanes 43-46 are vertically offset from each other in sets. They are operatively connected at or adjacent the remote ends 52 thereof to the posts 49, 50, and at or adjacent the proximate ends 53 thereof to the shafts 41, 42. Extending upwardly from arm 47 is a single shaft stub 55, and extending downwardly is another stub 56. Both stubs 55, 56 can serve as mounts, such as by connecting them to conventional bearings shown schematically at 57, 58. A driven device, shown schematically at 59, may also be connected by any suitable conventional mechanism.

Figure 9:
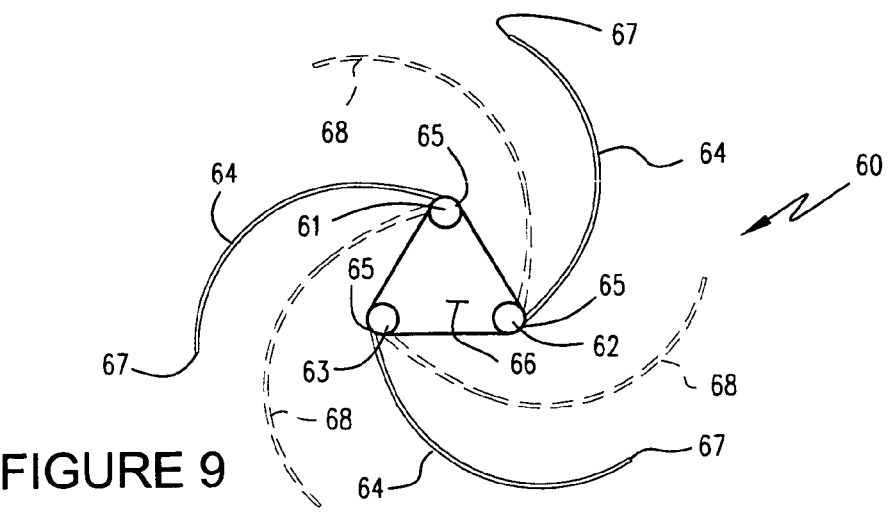
FIG. 9 is a horizontal cross-sectional view of a Savonius wind turbine rotor embodiment wherein a third central shaft and third vane are provided.

In the FIG. 9 embodiment, the shaft construction 17 of the omni-directional Savonius rotor 60 comprises three central, horizontally spaced, substantially vertical shafts 61, 62, 63, e.g. at the apexes of an equilateral triangle as illustrated in the exemplary embodiment of FIG. 9, and desirably connected together at one or both of the tops and bottoms thereof (and intermediate locations if necessary or desirable) by generally triangularly shaped plates, such as the bottom plate 66 schematically illustrated in FIG. 9. The edges of the plates 66 may be aerodynamic. The shafts 61-63 and plate(s) 66 may be of aluminum, fiber-reinforced plastic, or any other suitable material.

Each shaft 61-63 has a vane 64 associated therewith, operatively connected at or adjacent a proximate end 65 thereof to a respective shaft 61-63, with the proximate ends 65 overlapping. The vanes 64 may be of any suitable material, such as is described for the embodiments above. The remote ends 67 of the vanes 64 may also be connected to other shafts like the shafts 50 in the FIG. 8 embodiment, although normally that is unnecessary if spokes (not shown in FIG. 9) are provided like the spokes in the FIGS. 6 & 7 embodiment. More than three shafts 61-63 may also be provided, although normally two or three shafts (and associated vanes) are optimum.

FIG. 9 also shows the vanes 64 as one set, and a second set of vanes 68 (shown in dotted line) associated with the shafts 61-63 and mounted vertically above or below the set 64 and offset with respect to the first set of vanes 64 so as to enhance smooth rotation of the shafts 61-63 about a substantially vertical axis. Any number of sets of vanes may be provided, with the various sets offset from each other about 5-90 degrees, e.g. about 10-45 degrees. Such offset sets of vanes may also be provided for any of the FIGS. 1-8 embodiments too. However, with the three vane embodiment of FIG. 9 it often is not necessary to have offset sets since the three vane configuration usually provides substantially smooth operation.

While the invention has been herein shown and described in what is presently conceived to be the preferred embodiment thereof, it is to be understood that the invention has a broad range of equivalents, and is to be interpreted as broad as is allowed by the prior art. For example, and example only, the curvature of the vanes may comprise any known (such as shown in *Wind Engineering*, Vol. 2, No. 2, 1978, pp. 75-85, Khan, "Model and Prototype Performance Characteristics of Savonius Rotor Windmill", incorporated by reference herein) or hereafter developed curvature that is desirable. Also, all numerical ranges set forth in the specification are approximate, and specifically include all narrow ranges within each broad range.

What is claimed is:

1. A Savonius vertical axis rotor comprising: first and second curved vanes having remote substantially vertical edges widely spaced from each other, and proximate substantially vertical edges more closely horizontally spaced from each other and horizontally overlapping; and a single substantially vertical central perforated shaft operatively connected to said vanes and adjacent said proximate edges of said vanes, and mounting said vanes so that, during use, there is spillover of wind from one vane proximate edge to another vane during powered rotation of said vanes in response to wind.

2. A Savonius vertical axis rotor as recited in claim 1 in combination with a mount which mounts said shaft construction and vanes for rotation about a substantially vertical axis, and for operative connection of said shaft construction to a powered element, to provide a wind turbine; and wherein said mount comprises a solid wall continuation portion of said perforated shaft adjacent a bottom portion of said shaft.

3. A Savonius vertical axis rotor as recited in claim 1 further comprising a third curved vane having remote and proximate substantially vertical edges, and wherein said substantially vertical central perforated shaft is operatively connected to said third vane and adjacent said proximate edge of said third vane, and mounts said vanes so that, during use, there is spillover of wind from each vane proximate edge to another vane during powered rotation of said vanes in response to wind.

4. A Savonius vertical axis rotor as recited in claim 3 wherein said varies are operatively connected to said central shaft at said proximate edges of said vanes.

5. A Savonius vertical axis rotor as recited in claim 3 further comprising curved substantially rigid substantially radially extending spokes operatively connected to portions of each of said vanes, and to said shaft.

6. A Savonius vertical axis rotor as recited in claim 1 wherein said vanes are operatively connected to said central shaft at said proximate edges of said vanes.

7. A Savonius vertical axis rotor as recited in claim 1 further comprising substantially rigid curved substantially radially extending spokes operatively connected to portions of said vanes, and to said shaft.

8. A Savonius vertical axis wind turbine rotor comprising: first and second at least partially curved vanes having remote edges widely spaced from each other, and proximate edges closely spaced from each other, said vanes of flexible, collapsible, material; first and second sets of a plurality of substantially rigid substantially radially extending spokes operatively connected to said first and second vanes, respectively, at least one spoke of each set having a collar adjacent said proximate edge of the vane with which it is associated; first and second horizontally spaced substantially vertical rotatable central shafts operatively connected to said first and second sets of spokes, respectively, said collars encircling said shafts so that said spokes are movable along said shafts from a position in which said vanes are operative to a position in which said vanes are collapsed; and said shafts mounting said vane proximate edges so that they are overlapped and so that there is spillover from one vane proximate edge to another vane during rotation of said vanes.

9. A Savonius vertical axis wind turbine rotor as recited in claim 8 further comprising a third curved vane having remote and proximate edges, and further comprising a third substantially vertical central shaft operatively connected to said third vane and horizontally spaced from said first and second shafts and rotatable with said first and second shafts, said shafts mounting said vane proximate edges so that they are overlapped and so that there is spillover from each vane proximate edge to another vane during rotation of said vanes.

10. A Savonius vertical axis wind turbine rotor as recited in claim 8 wherein a plurality of spokes of each set have collars receiving and movable along said shafts.

11. An omni-directional Savonius vertical axis wind turbine rotor comprising: first and second curved vanes having remote substantially vertical edges widely spaced from each other, and proximate substantially vertical edges more closely horizontally spaced from each other and horizontally overlapping; and a substantially vertical central shaft construction operatively connected to said vanes and mounting said vanes adjacent said proximate edges so that, during use, there is spillover of wind from the proximate edge of one vane to another vane during powered rotation of the vanes in response to wind; wherein said shaft construction comprises first and second horizontally spaced substantially vertical shafts adjacent said proximate edges of said first and second vane, respectively; and further comprising curved substantially rigid spokes operatively connected to said vanes and said shafts and extending substantially radially outwardly from said shafts.

12. An omni-directional Savonius vertical axis wind turbine rotor as recited in claim 11 wherein said vanes are of flexible, collapsible, material and said spokes can move along said shafts.

13. An omni-directional Savonius vertical axis wind turbine rotor comprising: first and second curved vanes having remote substantially vertical edges widely spaced from each other, and proximate substantially vertical edges more closely horizontally spaced from each other and horizontally overlapping; and a substantially vertical central shaft construction operatively connected to said vanes and mounting said vanes adjacent said proximate edges so that, during use, there is spillover of wind from the proximate edge of one vane to another vane during powered rotation of the vanes in response to, wind; wherein said shaft construction comprises first and second horizontally spaced substantially vertical shafts adjacent said proximate edges of said first and second vane, respectively; and wherein said vanes are of relatively rigid, substantially non-collapsible, material, and wherein said vanes are operatively connected to said shafts at said proximate ends thereof.

14. An omni-directional Savonius vertical axis wind turbine rotor as recited in claim 13 further comprising vertically spaced first and second substantially horizontally extending connecting elements which operatively connect said first and second shafts together without significantly interfering with spillover of wind from one vane to another vane.

15. An omni-directional Savonius vertical axis wind turbine rotor as recited in clam 14 in combination with a mount which mounts said shaft construction and vanes for rotation about a substantially vertical axis, and for operative connection of said shaft construction to a powered element, to provide a wind turbine.

16. An omni-directional Savonius vertical axis wind turbine as recited in claim 15 wherein said mount comprises a single shaft element adjacent bottom portions of said shafts and operatively attached to said shafts so that said turbine is substantially devoid of a top mount for said rotor; and wherein said single shaft element is connected to said first and second shafts by attachment to said first connecting element.

17. An omni-directional Savonius vertical axis wind turbine rotor as recited in claim 13 further comprising a third curved vane having remote and proximate substantially vertical edges, and wherein said shaft construction comprises a third substantially vertical shaft operatively connected to said third vane so that the proximate ends of said first, second, and third vanes are spaced from each other and, during use, there is spillover of wind from each vane to another vane during rotation of said shafts.

18. An omni-directional Savonius vertical axis wind turbine rotor as recited in claim 13 further comprising curved substantially rigid spokes operatively connected to said vanes and said shafts and extending substantially radially outwardly from said shafts.

19. An omni-directional Savonius vertical axis wind turbine rotor as recited in claim 13 wherein said first and second vanes comprise a first set, and further comprising a second set of vanes associated with said central shaft construction and mounted vertically above said first set and offset with respect to said first set so as to enhance smooth rotation of said shaft construction and vanes about a substantially vertical axis.

* * * * *